(12) United States Patent
Wang et al.

(10) Patent No.: US 7,870,486 B2
(45) Date of Patent: Jan. 11, 2011

(54) SYSTEM AND METHOD FOR SIMULTANEOUSLY COMMENCING OUTPUT OF DISPARATELY ENCODED ELECTRONIC DOCUMENTS

(75) Inventors: Jianxin Wang, Trabuco Canyon, CA (US); Hongfeng Wei, Anaheim, CA (US); William Su, Riverside, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 905 days.

(21) Appl. No.: 11/736,969

(22) Filed: Apr. 18, 2007

(65) Prior Publication Data

US 2008/0189610 A1 Aug. 7, 2008

Related U.S. Application Data

(60) Provisional application No. 60/886,834, filed on Jan. 26, 2007.

(51) Int. Cl.
*G06F 17/21* (2006.01)

(52) U.S. Cl. ............... 715/277; 715/273; 715/274; 715/276

(58) Field of Classification Search .......... 715/273, 715/274, 276, 277
See application file for complete search history.

(56) References Cited

U.S. PATENT DOCUMENTS

| | | | | |
|---|---|---|---|---|
| 5,579,087 A | * | 11/1996 | Salgado | 399/1 |
| 5,600,762 A | * | 2/1997 | Salgado et al. | 358/1.15 |
| 5,718,520 A | * | 2/1998 | MacKay | 400/61 |
| 5,923,846 A | * | 7/1999 | Gage et al. | 709/213 |
| 6,008,812 A | * | 12/1999 | Ueda et al. | 345/418 |
| 6,173,295 B1 | * | 1/2001 | Goertz et al. | 715/209 |
| 7,630,092 B1 | * | 12/2009 | Suzuki et al. | 358/1.14 |
| 2002/0089689 A1 | * | 7/2002 | Ferlitsch et al. | 358/1.15 |
| 2004/0130744 A1 | * | 7/2004 | Wu et al. | 358/1.15 |
| 2005/0111024 A1 | * | 5/2005 | Ferlitsch | 358/1.13 |
| 2006/0209330 A1 | * | 9/2006 | Mitsui | 358/1.13 |

OTHER PUBLICATIONS

Desktop Document Manager R2.7.5 User's Guide, 2000-2001, Sharp Corporation, Chapter 7.*

* cited by examiner

*Primary Examiner*—Stephen S Hong
*Assistant Examiner*—I-Chan Yang
(74) *Attorney, Agent, or Firm*—SoCal IP Law Group LLP; Steven C. Sereboff; Jonathan Pearce (57) ABSTRACT

The subject application is directed to a system and method for simultaneously commencing output of disparately encoded electronic documents. Selection data representative of multiple electronic documents encoded in multiple disparate formats is first received. For example, the electronic documents are capable of being encoded in MICROSOFT OFFICE WORD, MICROSOFT OFFICE EXCEL, ADOBE ACROBAT formats, and the like. Each of the disparate formats is associated with a corresponding software module and then retrieved in accordance with received selection data. Next, the electronic documents are communicated to corresponding software modules, and the document processing device commences a selected document processing operation on each of the electronic documents by a corresponding software module. Each application-specific module is adapted for processing a document processing request for one or more types of documents that are associated with one specific application.

15 Claims, 8 Drawing Sheets

SYSTEM AND METHOD FOR SIMULTANEOUSLY COMMENCING OUTPUT OF DISPARATELY ENCODED ELECTRONIC DOCUMENTS

CROSS-REFERENCE TO RELATED APPLICATIONS

This applications claims priority to U.S. Provisional Patent Application Ser. No. 60/886,834, filed Jan. 26, 2007, titled A SYSTEM AND METHOD FOR APPLICATION-INDEPENDENT DOCUMENT PROCESSING OPERATIONS, the entirety of which is incorporated herein.

BACKGROUND OF THE INVENTION

The subject application is directed to a system and method for application-independent document processing operations. More particularly, the subject application is directed to a system and method for multiple document output without manually initiating each application corresponding to the documents, issuing output commands in each application, and setting output preferences corresponding thereto.

Document processing typically involves the use of a plurality of applications, with each application employing a variety of file types. In order to output a file to a document processing device, such as a copier, printer, facsimile machine, or a multifunction peripheral device, the application from which the file is derived must first be opened. Thereafter, an output command is invoked from the interface provided by the application. When outputting multiple files corresponding to multiple different applications, each file has to be first opened in its corresponding application and the output commands evoked from the application interface. When any document needs output settings differing from the application's default settings, a user is forced to open an output preference dialog to set the desired settings.

SUMMARY OF THE INVENTION

In accordance with the subject application, there is provided a system and method for application-independent document processing operations.

Further, in accordance with the subject application, there is provided a system and method for simultaneously processing and outputting disparately encoded electronic documents.

Still further, in accordance with the subject application, there is provided a system and method that allow for processing and outputting multiple disparately encoded electronic documents without manually initiating each application corresponding to the documents, issuing output commands in each application, and setting output preferences corresponding thereto.

Further, in accordance with one embodiment of the subject application, there is provided a system for simultaneously commencing output of disparately encoded electronic documents. The system includes means adapted for receiving selection data representative of a plurality of user-selected electronic documents encoded in a plurality of disparate formats and association means adapted for associating each of the plurality of disparate formats with at least one software module. The system further includes means adapted for retrieving the plurality of user-selected electronic documents in accordance with received selection data and means adapted for communicating each of the plurality of user-selected electronic documents to one of a plurality of corresponding software modules in accordance with an output of the association means. The system also includes document processor means adapted for commencing a selected document processing operation on each of the user-selected electronic documents by a software module associated therewith.

In one embodiment of the subject application, the system further includes means adapted for acquiring document output characteristics associated with each of the plurality of selected electronic documents and means adapted for communicating configuration data corresponding to acquired document output characteristics to each of the software modules in a format compatible thereto.

In another embodiment of the subject application, the system also includes means adapted for prompting an associated user for input of common document output characteristics in accordance with common features associated with each software module.

In yet another embodiment of the subject application, the system also includes means adapted for outputting data representative of an event wherein at least one of the plurality of user-selected electronic documents has no software module associated therewith.

In accordance with one embodiment of the subject application, the document processing means includes means adapted for commencing each document processing operation in a selected order.

In another embodiment of the subject application, the system also comprises means adapted for communicating an output of each software module to a common document output device.

Still further, in accordance with one embodiment of the subject application, there is provided a method for simultaneously commencing output of disparately encoded electronic documents.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for application-independent document processing operations. In one particular embodiment, the subject application is directed to a system and method for simultaneously processing and outputting disparately encoded electronic documents. More particularly, one embodiment of the subject application is directed to a system and method for processing and outputting multiple disparately encoded electronic documents without manually initiating each application corresponding to the documents, issuing output commands in each application, and setting output preferences corresponding thereto.

It will become apparent to those skilled in the art that the system and method described herein are suitably adapted to a plurality of varying electronic fields employing user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
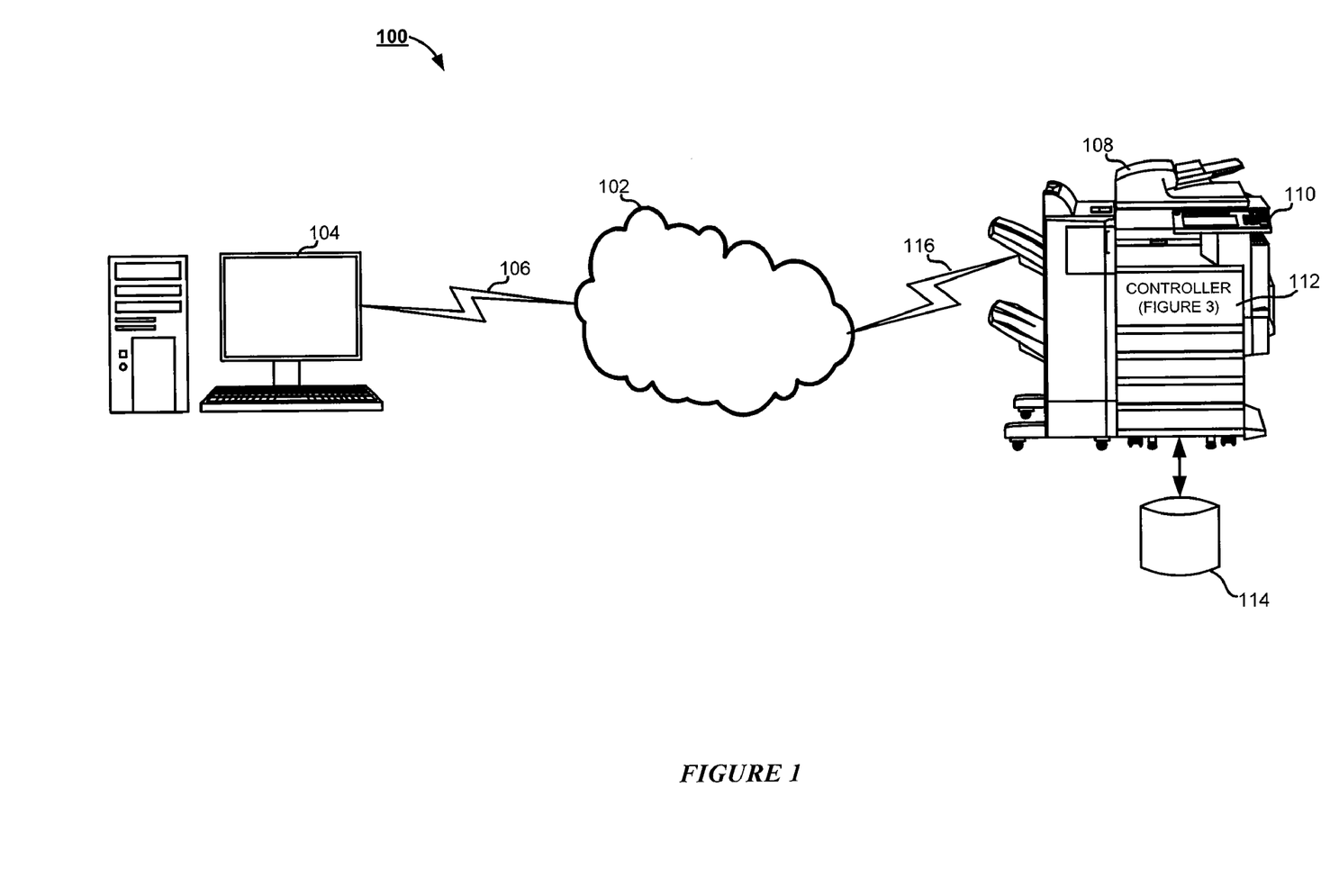
FIG. 1 is an overall diagram of the system for simultaneously commencing output of disparately encoded electronic documents according to one embodiment of the subject application.

Referring now to FIG. 1, there is shown an overall diagram of the system 100 for simultaneously commencing output of disparately encoded electronic documents in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 illustrated in FIG. 1 further depicts a workstation 104, in data communication with the computer network 102 via a communications link 106. It will be appreciated by those skilled in the art that the workstation 104 is shown in FIG. 1 for illustration purposes only. As will be understood by those skilled in the art, the workstation 104 is representative of any personal computing or user device known in the art, including, for example and without limitation, a laptop computer, a personal computer, a personal data assistant, a web-enabled cellular telephone, a smart phone, a proprietary network device, or other web-enabled electronic device. The communications link 106 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the workstation 104 is suitably adapted to generate and transmit electronic documents, document processing instructions, user interface modifications, upgrades, updates, personalization data, or the like, to a document processing device 108, a document management system server, or any other similar device coupled to the computer network 102. The functioning of the workstation 104 will better be understood in conjunction with the block diagram illustrated in FIG. 2, explained in greater detail below.

As shown in FIG. 1, the system 100 also illustrates a document processing device 108, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 108 is suitably adapted to provide remote document processing services to external or network devices. Preferably, the document processing device 108 includes hardware, software, and any suitable combination thereof, configured to interact with an associated user, a networked device, or the like.

According to one embodiment of the subject application, the document processing device 108 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 108 further includes an associated user interface 110, such as a touch-screen, LCD display, touch-panel, alpha-numeric keypad, or the like, via which an associated user is able to interact directly with the document processing device 108. In accordance with the preferred embodiment of the subject application, the user interface 110 is advantageously used to communicate information to the associated user and receive selections from the associated user. The skilled artisan will appreciate that the user interface 110 comprises various components, suitably adapted to present data to the associated user, as are known in the art. In accordance with one embodiment of the subject application, the user interface 110 comprises a display, suitably adapted to display one or more graphical elements, text data, images, or the like, to an associated user, receive input from the associated user, and communicate the same to a backend component, such as a controller 112, as explained in greater detail below. Preferably, the document processing device 108 is communicatively coupled to the computer network 102 via a suitable communications link 116. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 108 further incorporates a backend component, designated as the controller 112, suitably adapted to facilitate the operations of the document processing device 108, as will be understood by those skilled in the art. Preferably, the controller 112 is embodied as hardware, software, or any suitable combination thereof, configured to control the operations of the associated document processing device 108, facilitate the display of images via the user interface 110, direct the manipulation of electronic image data, and the like. For purposes of explanation, the controller 112 is used to refer to any myriad of components associated with the document processing device 108, including hardware, software, or combinations thereof, functioning to perform, cause to be performed, control, or otherwise direct the methodologies described hereinafter. It will be understood by those skilled in the art that the methodologies described with respect to the controller 112 are capable of being performed by any general purpose computing system, known in the art, and thus the controller 112 is representative of such a general computing device and is intended as such when used hereinafter. Furthermore, the use of the controller 112 hereinafter is for the example embodiment only, and other embodiments, which will be apparent to one skilled in the art, are capable of employing the system and method for generating an electronic document for transmission to multiple destinations of the subject application. The functioning of the controller 112 will better be understood in conjunction with the block diagrams illustrated in FIGS. 3 and 4, explained in greater detail below.

Communicatively coupled to the document processing device 108 is a data storage device 114. In accordance with the preferred embodiment of the subject application, the data storage device 114 is any mass storage device known in the art including, for example and without limitation, magnetic storage drives, a hard disk drive, optical storage devices, flash memory devices, or any suitable combination thereof. In the preferred embodiment, the data storage device 114 is suitably adapted to store document data, image data, electronic database data, applications, programs, or the like.

It will be appreciated by those skilled in the art that while illustrated in FIG. 1 as being a separate component of the system 100 coupled to the document processing device 108, the data storage device 114 is capable of being implemented as internal storage component of the document processing device 108, a component of the controller 112, or the like, such as, for example and without limitation, an internal hard disk drive, or the like. As will be further recognized by a skilled artisan, the data storage device 114 is also capable of being coupled to the document workstation 104 (not shown in the drawing), or implemented as internal storage component of the workstation 104, such as, for example and without limitation, an internal hard disk drive, or the like. In accordance with one embodiment of the subject application, the data storage device 114 includes an operating system having a system registry, such as a WINDOWS-based operating system produced by the MICROSOFT CORPORATION. In such an embodiment, the data storage device 114 includes one or more applications, as will be understood by those skilled in the art. Preferably, the data storage device 114 further includes means adapted for receiving selection data representative of a plurality of user-selected electronic documents encoded in a plurality of disparate formats, association means adapted for associating each of the plurality of disparate formats with at least one software module, means adapted for retrieving the plurality of user-selected electronic documents in accordance with received selection data, and means adapted for communicating each of the plurality of user-selected electronic documents to one of a plurality of corresponding software modules in accordance with an output of the association means, such as a command parser, a command dispatcher, device drivers, and the like.

Figure 2:
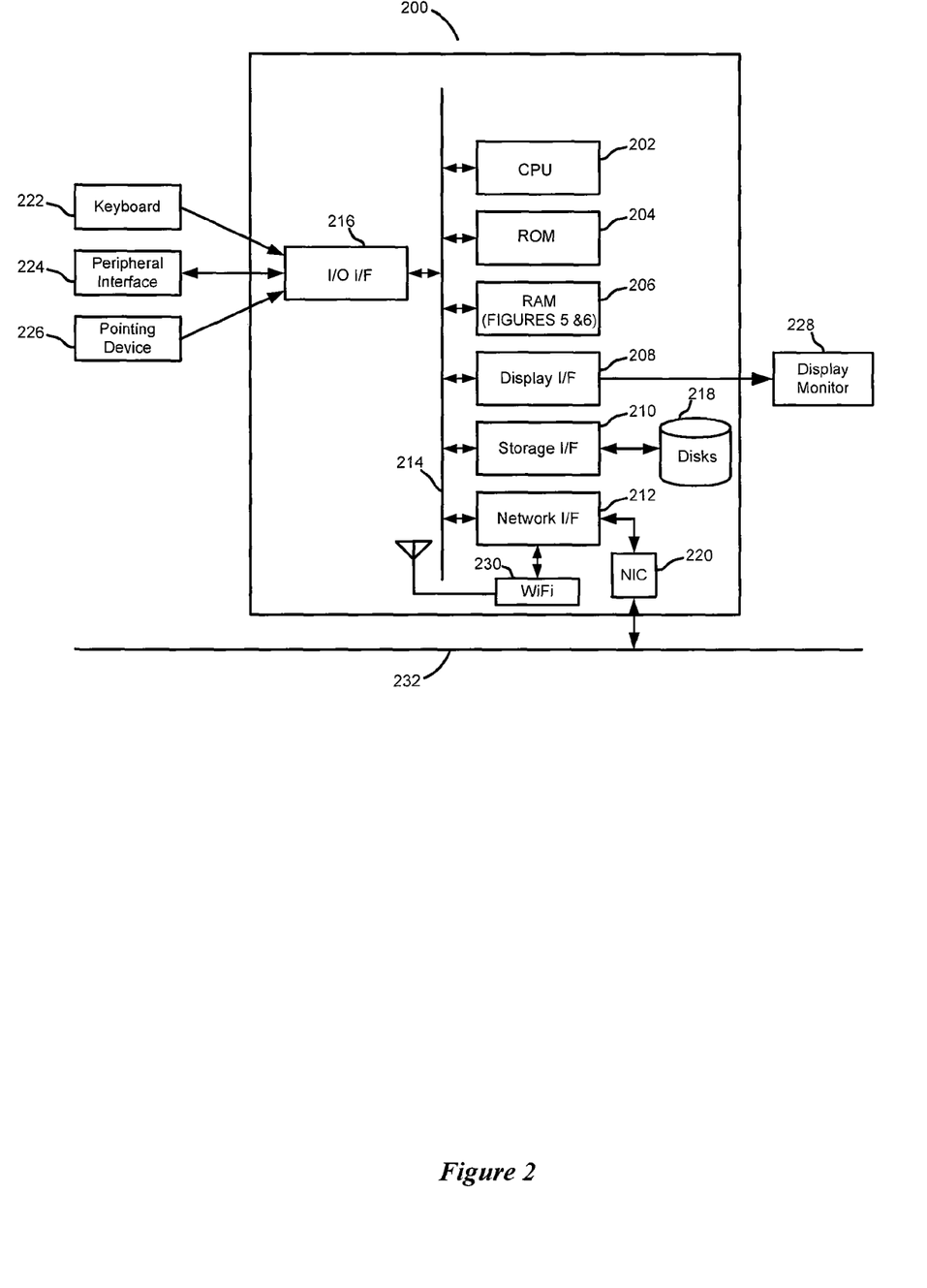
FIG. 2 is a block diagram illustrating workstation hardware for use in the system for simultaneously commencing output of disparately encoded electronic documents according to one embodiment of the subject application.

Turning now to FIG. 2, illustrated is a representative architecture of a suitable device 200 on which operations of the subject system are completed. Included is a processor unit 202 which is advantageously placed in data communication with read only memory 204, suitable non-volatile read only memory, volatile read only memory or a combination thereof, random access memory 206, display interface 208, storage interface 210, and network interface 212. In a preferred embodiment, interface to the foregoing modules is suitably accomplished via a bus 214.

The read only memory 204 suitably includes firmware, such as static data or fixed instructions, such as BIOS, system functions, configuration data, and other routines used for operation of the server 200 via CPU 202.

The random access memory 206 provides a storage area for data and instructions associated with applications and data handling accomplished by the processor 202.

The display interface 208 receives data or instructions from other components on the bus 214, which data is specific to generating a display to facilitate a user interface. The display interface 208 suitably provides output to a display terminal 226, suitably a video display device such as a monitor, LCD, plasma, or any other suitable visual output device as will be appreciated by one of ordinary skill in the art.

The storage interface 210 suitably provides a mechanism for non-volatile, bulk or long term storage of data or instructions in the server 200. The storage interface 210 suitably uses a storage mechanism, such as storage 218, suitably comprised of a disk, tape, CD, DVD, or other relatively higher capacity addressable or serial storage medium.

The network interface 212 suitably communicates to at least one other network interface, shown as network interface 220, such as a network interface card, and wireless network interface 230, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 220 is interconnected for data interchange via a physical network 232, suitably comprised of a local area network, wide area network, or a combination thereof.

An input/output interface 216 in data communication with the bus 214 is suitably connected with an input device 222, such as a keyboard or the like. The input/output interface 216 also suitably provides data output to a peripheral interface 224, such as a USB, universal serial bus output, SCSI, Firewire (IEEE 1394) output, or any other interface as may be appropriate for a selected application. Finally, the input/output interface 216 is suitably in data communication with a pointing device interface 228 for connection with devices, such as a mouse, light pen, touch screen, or the like.

Figure 3:
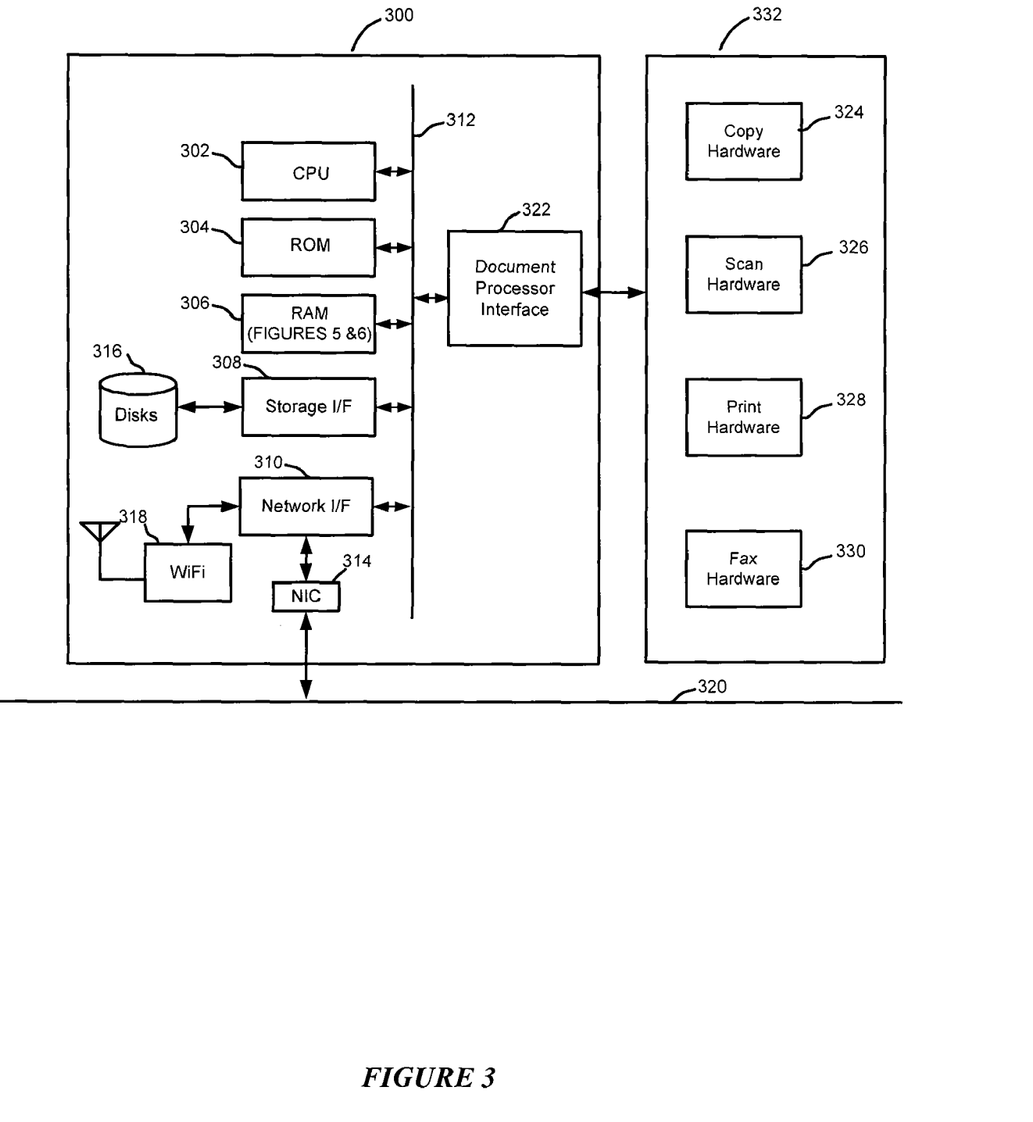
FIG. 3 is a block diagram illustrating controller hardware for use in the system for simultaneously commencing output of disparately encoded electronic documents according to one embodiment of the subject application.

Turning now to FIG. 3, illustrated is a representative architecture of a suitable backend component, i.e., the controller 300, shown in FIG. 1 as the controller 112, on which operations of the subject system 100 are completed. The skilled artisan will understand that the controller 112 is representative of any general computing device, known in the art, capable of facilitating the methodologies described herein. Included is a processor 302, suitably comprised of a central processor unit. However, it will be appreciated that processor 302 may advantageously be composed of multiple processors working in concert with one another as will be appreciated by one of ordinary skill in the art. Also included is a non-volatile or read only memory 304 which is advantageously used for static or fixed data or instructions, such as BIOS functions, system functions, system configuration data, and other routines or data used for operation of the controller 112.

Also included in the controller 300 is random access memory 306, suitably formed of dynamic random access memory, static random access memory, or any other suitable, addressable and writable memory system. Random access memory provides a storage area for data instructions associated with applications and data handling accomplished by processor 302.

A storage interface 308 suitably provides a mechanism for non-volatile, bulk or long term storage of data associated with the controller 300. The storage interface 308 suitably uses bulk storage, such as any suitable addressable or serial storage, such as a disk, optical, tape drive and the like as shown as 316, as well as any suitable storage medium as will be appreciated by one of ordinary skill in the art.

A network interface subsystem 310 suitably routes input and output from an associated network allowing the controller 300 to communicate to other devices. The network interface subsystem 310 suitably interfaces with one or more connections with external devices to the device 300. By way of example, illustrated is at least one network interface card 314 for data communication with fixed or wired networks, such as Ethernet, token ring, and the like, and a wireless interface 318, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 314 is interconnected for data interchange via a physical network 320, suitably comprised of a local area network, wide area network, or a combination thereof.

Data communication between the processor 302, read only memory 304, random access memory 306, storage interface 308 and the network interface subsystem 310 is suitably accomplished via a bus data transfer mechanism, such as illustrated by bus 312.

Also in data communication with bus the 312 is a document processor interface 322. The document processor interface 322 suitably provides connection with hardware 332 to perform one or more document processing operations. Such operations include copying accomplished via copy hardware 324, scanning accomplished via scan hardware 326, printing accomplished via print hardware 328, and facsimile communication accomplished via facsimile hardware 330. It is to be appreciated that the controller 300 suitably operates any or all of the aforementioned document processing operations. Systems accomplishing more than one document processing operation are commonly referred to as multifunction peripherals or multifunction devices.

Figure 4:
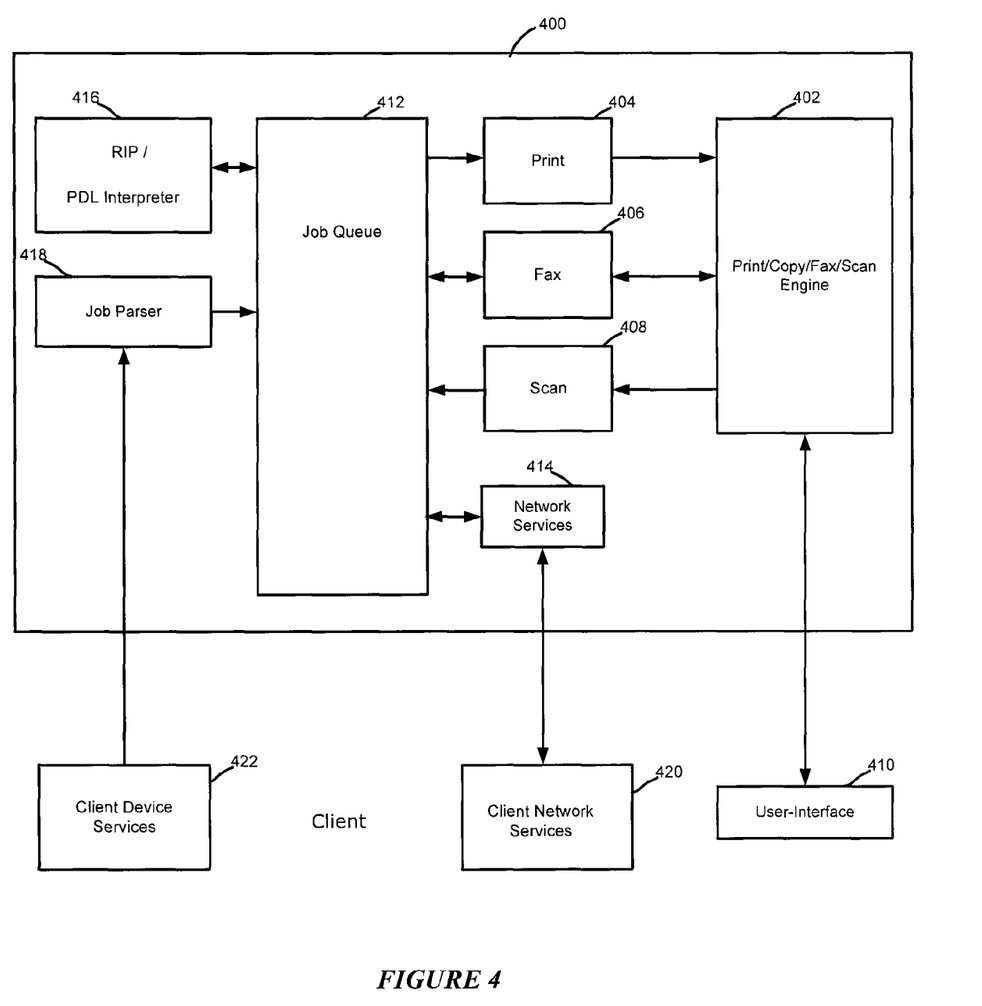
FIG. 4 is a functional diagram illustrating the controller for use in the system for simultaneously commencing output of disparately encoded electronic documents according to one embodiment of the subject application.

Functionality of the subject system 100 is accomplished on a suitable document processing device, such as the document processing device 108, which includes the controller 300 of FIG. 3, (shown in FIG. 1 as the controller 112) as an intelligent subsystem associated with a document processing device. In the illustration of FIG. 4, controller function 400 in the preferred embodiment, includes a document processing engine 402. A suitable controller functionality is that incorporated into the Toshiba e-Studio system in the preferred embodiment. FIG. 4 illustrates suitable functionality of the hardware of FIG. 3 in connection with software and operating system functionality as will be appreciated by one of ordinary skill in the art.

In the preferred embodiment, the engine 402 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 402 is suitably interfaced to a user interface panel 410, which panel allows for a user or administrator to access functionality controlled by the engine 402. Access is suitably enabled via an interface local to the controller, or remotely via a remote thin or thick client.

The engine 402 is in data communication with the print function 404, facsimile function 406, and scan function 408. These functions facilitate the actual operation of printing, facsimile transmission and reception, and document scanning for use in securing document images for copying or generating electronic versions.

A job queue 412 is suitably in data communication with the print function 404, facsimile function 406, and scan function 408. It will be appreciated that various image forms, such as bit map, page description language or vector format, and the like, are suitably relayed from the scan function 408 for subsequent handling via the job queue 412.

The job queue 412 is also in data communication with network services 414. In a preferred embodiment, job control, status data, or electronic document data is exchanged between the job queue 412 and the network services 414. Thus, suitable interface is provided for network based access to the controller function 400 via client side network services 420, which is any suitable thin or thick client. In the preferred embodiment, the web services access is suitably accomplished via a hypertext transfer protocol, file transfer protocol, uniform data diagram protocol, or any other suitable exchange mechanism. The network services 414 also advantageously supplies data interchange with client side services 420 for communication via FTP, electronic mail, TELNET, or the like. Thus, the controller function 400 facilitates output or receipt of electronic document and user information via various network access mechanisms.

The job queue 412 is also advantageously placed in data communication with an image processor 416. The image processor 416 is suitably a raster image process, page description language interpreter or any suitable mechanism for interchange of an electronic document to a format better suited for interchange with device functions such as print 404, facsimile 406 or scan 408.

Finally, the job queue 412 is in data communication with a parser 418, which parser suitably functions to receive print job language files from an external device, such as client device services 422. The client device services 422 suitably include printing, facsimile transmission, or other suitable input of an electronic document for which handling by the controller function 400 is advantageous. The parser 418 functions to interpret a received electronic document file and relay it to the job queue 412 for handling in connection with the afore-described functionality and components.

In operation, selection data representing a plurality of user-selected electronic documents encoded in a plurality of disparate formats is first received. Each of the disparate formats is then associated with at least one software module. The plurality of user-selected documents is then retrieved according to the received selection data. Each of the plurality of user-selected electronic documents is then communicated to one of a plurality of corresponding software modules according to the output of the association of each format with at least one software module. A selected document processing operation is then commenced on each of the user-selected electronic documents by a software module associated therewith.

In accordance with one example embodiment of the subject application, a controller 112 associated with the document processing device 108 receives selection data representing user-selected electronic documents that are encoded in disparate formats. Such formats include, for example and without limitation, MICROSOFT OFFICE WORD, MICROSOFT OFFICE EXCEL, ADOBE ACROBAT formats, and the like. It will be appreciated by those skilled in the art that the selection data is capable of being received via the computer network 102 from the workstation 104, or directly via the associated user interface 110. A component of the document processing device 108, such as a command dispatcher, associates each of the disparate formats with a corresponding software module. A determination is then made by the dispatcher whether any of the electronic documents do not have an associated software module. When any one of the selected electronic documents lacks an associated software module, the controller 112, or other component associated with the document processing device 108, outputs data representing the lack of association.

When it is determined that all documents are associated with corresponding software modules, the user-selected electronic documents are retrieved by the document processing device 108 based upon the received selection data. The controller 112, or other suitable component associated with the document processing device 108 then acquires output characteristics associated with each of the selected electronic documents. The user is then prompted, via the user interface 110, to input common document output characteristics according to common features associated with each software module. As will be recognized by those skilled in the art, document output characteristics are capable of being input by an associated user at the workstation 104 to be communicated to the document processing device 108 via the computer network 102. Upon acquisition of output characteristics associated with each document, the document processing device 108, via the controller 112 or other suitable component thereof, then communicates configuration data to each of the software modules corresponding to acquired document output characteristics in a compatible format. That is, the selected document with associated output characteristics is communicated to a corresponding software module. The software modules then commence processing of their corresponding electronic documents in a selected order. The output of each software module is then communicated to a common output document output device, e.g., the document processing device 108, the controller 112, the workstation 104, or the like.

In accordance with another example embodiment of the subject application, the system 100 includes an operating system, as will be known in the art. Suitable operating systems include, for example and without limitation, a WINDOWS-based operating system produced by the MICROSOFT CORPORATION, or the like. While discussed herein as a software component, the skilled artisan will appreciate that the system and method described herein is capable of implementation as hardware, software, or a suitable combination thereof. The software component is initiated on the document processing device 108, as will be understood by those skilled in the art. It will further be appreciated by those skilled in the art that while reference is made hereinafter to operations on the document processing device 108, the subject application is capable of implementation by any of a host of electronic devices including, for example and without limitation, the workstation 104, a web-enabled portable device, a smart phone, a proprietary network device, a laptop computer, or the like.

For example, when a command dispatcher included in the storage device 114 generates a device configuration request, it is communicated to a settings component associated with the device driver. In accordance with one embodiment of the subject application, the device driver settings component is a dynamic link library (DLL), as will be understood by those skilled in the art. It will further be understood by those skilled in the art that such a communication corresponds to a request that the settings component of the driver verify the preferences and device settings contained in the document processing request. When the device driver settings component accepts that settings and preferences, a command dispatcher then identifies each specific application with which each document is associated. For example, when one electronic document file is a rich text format file (RTF), the application designated as the default application associated with RTF files is identified. Similarly, when another electronic document file is a portable document format (PDF) file, the dispatcher identifies the ADOBE product associated with PDF files.

Once the specific application has been identified by the dispatcher, an application-specific module associated with the dispatcher is activated. In accordance with one embodiment of the subject application, each application-specific module is adapted for processing a document processing request for one or more types of documents that are associated with one specific application. The application-specific module thereafter evokes the associated application to open the electronic document file and perform the requested document processing operation. For example, if a first software module is designed for processing MICROSOFT OFFICE WORD documents, RTF files or pure text files, all of which can be associated with MICROSOFT OFFICE WORD, the command dispatcher communicates the document processing request to the first software module when a request to process a MICROSOFT OFFICE WORD document is received. The first software module thereafter evokes MICROSOFT OFFICE WORD for further processing. As a further example, with a second software module is designed for processing PDF documents, the command dispatcher communicates the document processing request to the second software module upon receipt and identification of the document processing request to process a PDF document. The second software module thereafter evokes ADOBE ACROBAT READER for further processing.

In accordance with one aspect of the subject application, the document processing device 108 is capable of making a determination, prior to routing the document processing request to the dispatcher, whether the whether the document file contains any viruses. In the event that a virus is detected, a command parser, which is capable of appearing as console window to the user, resident on the document processing device 108 terminates the processing of the request and generates log data representing the termination of the request. Preferably, this log data is stored on the associated data storage device 114 for later analysis by the associated user. Preferably, the command parser is visible to the user, enabling the user to select the multiple documents for processing. Thereafter, the command dispatcher operates in the background, i.e., not visible to the user.

The command dispatcher communicates the data objects representing command line arguments to a settings component associated with a printer driver for a determination on whether the settings are valid or invalid. An invalid determination will abort the operation and log the aborted attempt. Upon validation of the settings, the dispatcher identifies the specific application associated with each electronic document file received in the document processing request. Thus, the dispatcher identifies MICROSOFT OFFICE WORD, MICROSOFT OFFICE EXCEL, and ADOBE ACROBAT as the applications associated, respectively, with each received file.

The dispatcher then activates application-specific modules corresponding to the identified applications, e.g., a MICROSOFT OFFICE WORD module, a MICROSOFT OFFICE EXCEL module, and an ADOBE ACROBAT module. Each document is then communicated, or handed off, to the module with which it is associated, based on its application. Each module then opens its corresponding document and initiates the print command within the specific application. In accordance with the command data, the applications communicate their respective documents to the printer driver, which directs output of the documents via the document processing device 108.

The skilled artisan will appreciate that the subject system 100 and components described above with respect to FIG. 1, FIG. 2, FIG. 3, and FIG. 4 will be better understood in conjunction with the methodologies described hereinafter with respect to FIG. 5, FIG. 6, FIG. 7, and FIG. 8.

Figure 5:
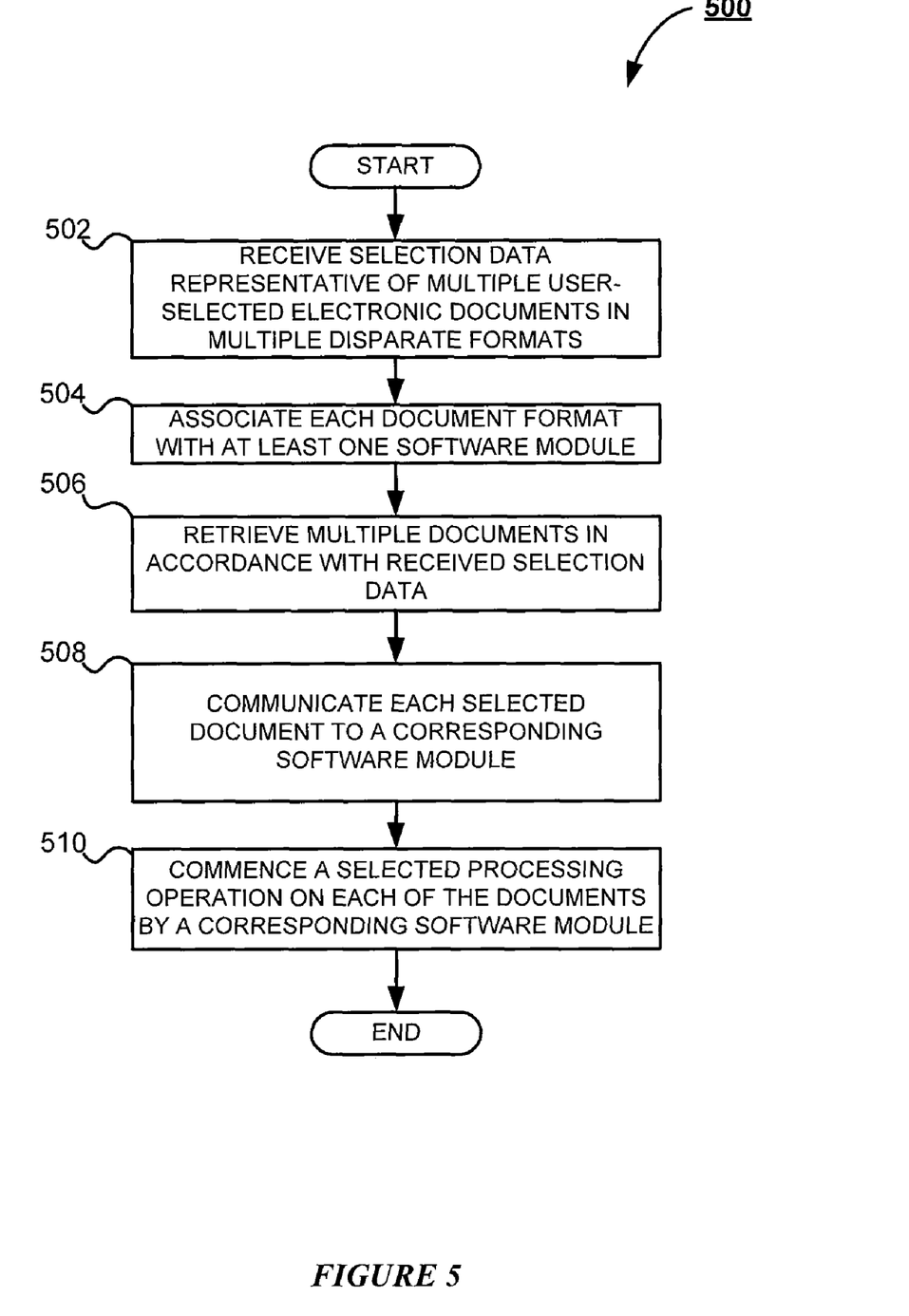
FIG. 5 is a flowchart illustrating a method for simultaneously commencing output of disparately encoded electronic documents according to one embodiment of the subject application.

Turning now to FIG. 5, there is shown a flowchart 500 illustrating a method for simultaneously commencing output of disparately encoded electronic documents from the point-of-view of the document processing device 108 in accordance with one embodiment of the subject application. Beginning at step 502, the controller 112 associated with the document processing device 108 receives selection data representing user-selected electronic documents that are encoded in multiple disparate formats. The skilled artisan will appreciate that such documents are capable of being encoded in MICROSOFT OFFICE WORD, MICROSOFT OFFICE EXCEL, ADOBE ACROBAT formats, and the like. It will also be appreciated by those skilled in the art that the selection data is capable of being received via the computer network 102 from the workstation 104, or directly via the associated user interface 110.

Flow then proceeds to step 504, whereupon each of the disparate formats is associated with a corresponding software module. In accordance with one embodiment of the subject application, the document processing device 108, via a command dispatcher or other suitable component thereof, associates each format with a corresponding software module. The user selected electronic documents are then retrieved by the controller 110, or other suitable component associated with the document processing device 108, based upon the received selection data at step 506. At step 508, each selected document is communicated to a software module corresponding to the document's format. That is, the output of the command dispatcher associated with the document processing device 108 determines to which of the software modules the document is communicated. Once the user-selected electronic documents are communicated to corresponding software modules at step 508, the document processing device 108 commences, at step 510, a selected document processing operation on each of the user-selected electronic documents by a software module associated therewith.

Figure 6:
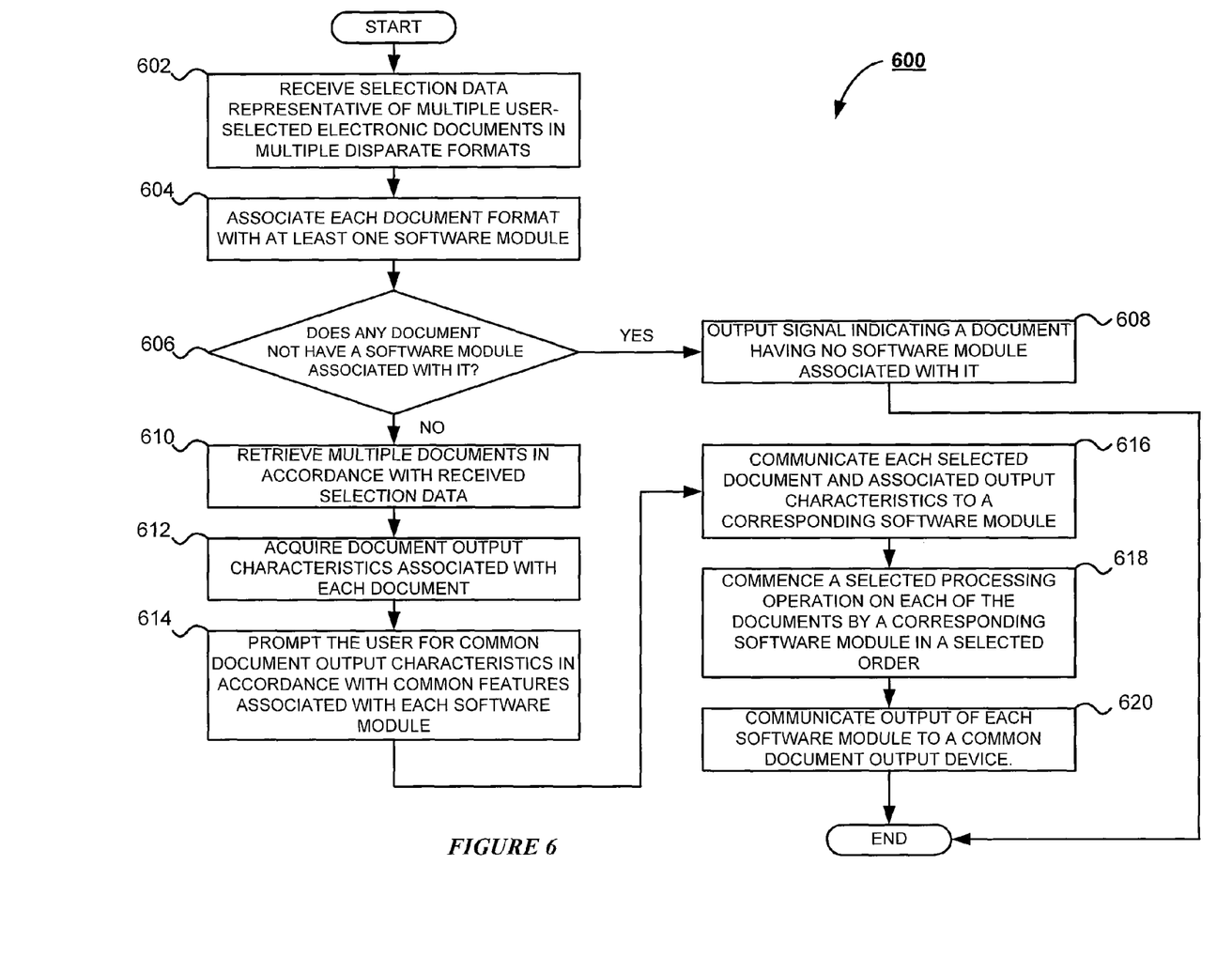
FIG. 6 is a flowchart illustrating a method for simultaneously commencing output of disparately encoded electronic documents according to another embodiment of the subject application.

Referring now to FIG. 6, there is shown a flowchart 600 illustrating a method for simultaneously commencing output of disparately encoded electronic documents from the point-of-view of the document processing device 108 in accordance with another embodiment of the subject application. Beginning at step 602, a controller 112 or other suitable component associated with the document processing device 108 receives selection data corresponding to electronic documents selected by a user that are encoded in multiple disparate formats. For example, documents are capable of being encoded in a MICROSOFT OFFICE format, and ADOBE portable document format, or the like. At step 604, each of the disparate formats is associated with a corresponding software module. In accordance with one embodiment of the subject application, the controller 110 of the document processing device 108 invokes a command dispatcher component, which facilitates the association of a document with a corresponding software module. A determination is then made at step 606, whether any of the selected electronic documents do not have an associated software module. When such a determination is positive, flow proceeds to step 608, whereupon a signal is generated and output indicating that one or more electronic documents lack an associated software module. Stated another way, when the command dispatcher determines that one or more of the selected electronic documents are encoded in a format that is not capable of being processed by any of the available software modules, an indicating signal is output to the user.

Upon a determination at step 606 that each of the selected electronic documents has a corresponding associated software module, flow proceeds to step 610. At step 610, the user-selected electronic documents are retrieved by the document processing device 108 based upon the received selection data. The controller 112, or other suitable component associated with the document processing device 108 then acquires, at step 612, output characteristics associated with each of the selected electronic documents. The user is then prompted, at step 614, to input common document output characteristics according to common features associated with each software module. As will be appreciated by those skilled in the art, document output characteristics are capable of being input by an associated user at the workstation 104 to be communicated to the document processing device 108 via the computer network 102.

Upon acquisition of output characteristics associated with each document, the document processing device 108, via the controller 112 or other suitable component thereof, then communicates each selected electronic document and associated document output characteristics to each of the corresponding software modules at step 616. Flow then proceeds to step 618, whereupon a selected processing operation is commenced on each of the documents by its corresponding software module in a selected order. The software modules then commence processing of their corresponding electronic documents in a selected order. At step 620, output of each software module is communicated to a common output device associated with the document processing device 108.

Figure 7:
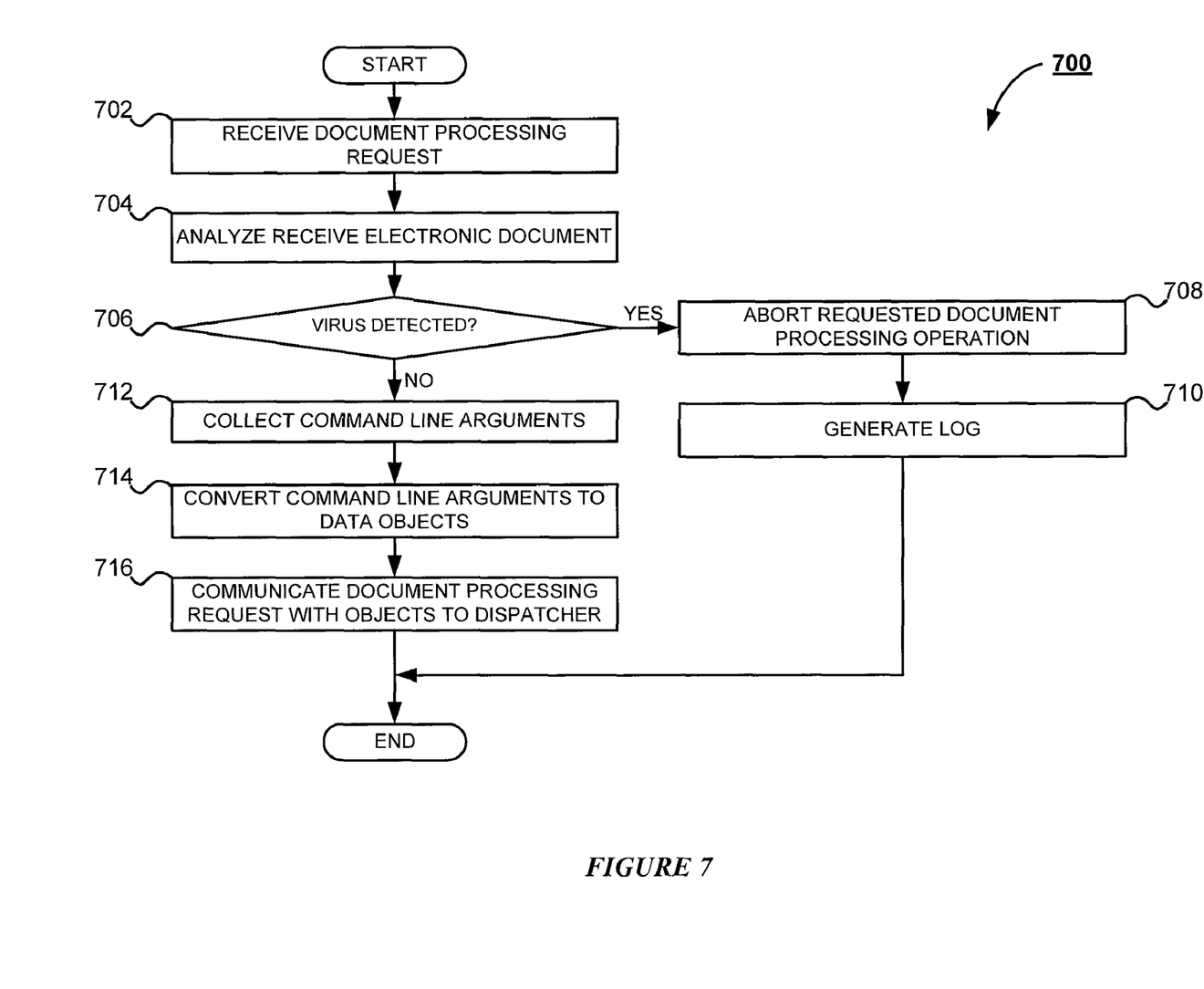
FIG. 7 is a flowchart illustrating a method for simultaneously commencing output of disparately encoded electronic documents according to another embodiment of the subject application.

Turning now to FIG. 7, there is shown a flowchart 700 illustrating a method for simultaneously commencing output of disparately encoded electronic documents from the command parser point-of-view in accordance with one embodiment of the subject application. Beginning at step 702, a command parser associated with the computer workstation 104 receives a document processing request inclusive of at least one electronic document file to be processed. The command parser, at step 704, then performs an analysis of the document to determine whether the document contains a virus. It will be appreciated by those skilled in the art that the command parser is capable of invoking a separate anti-virus component to facilitate the virus analysis.

When it is determined, at step 706, that an electronic document file is infected, i.e., a virus is detected, flow proceeds to step 708, whereupon the document processing request is terminated. Thereafter, at step 710, a log file is generated, preferably on the data storage device 114, indicative of the termination of the document processing request. Upon a determination, at step 706, that no viruses are found in the electronic document file, flow proceeds to step 712, whereupon the command parser collects command line arguments corresponding to the full path of the electronic document, output preferences, e.g., color, recipient, duplex, finishing options, etc., and any other output preferences, as will be understood by those skilled in the art. The collected command line arguments are then converted into appropriate data objects at step 714. For example, when the document processing request is a print request, stapling position data passed as a string argument, as all other arguments are passed, is converted into a predefined data type for processing by an associated device driver. The document processing request, inclusive of the electronic document file and associated data objects, are then communicated, at step 716, to a command dispatcher for further processing.

Figure 8:
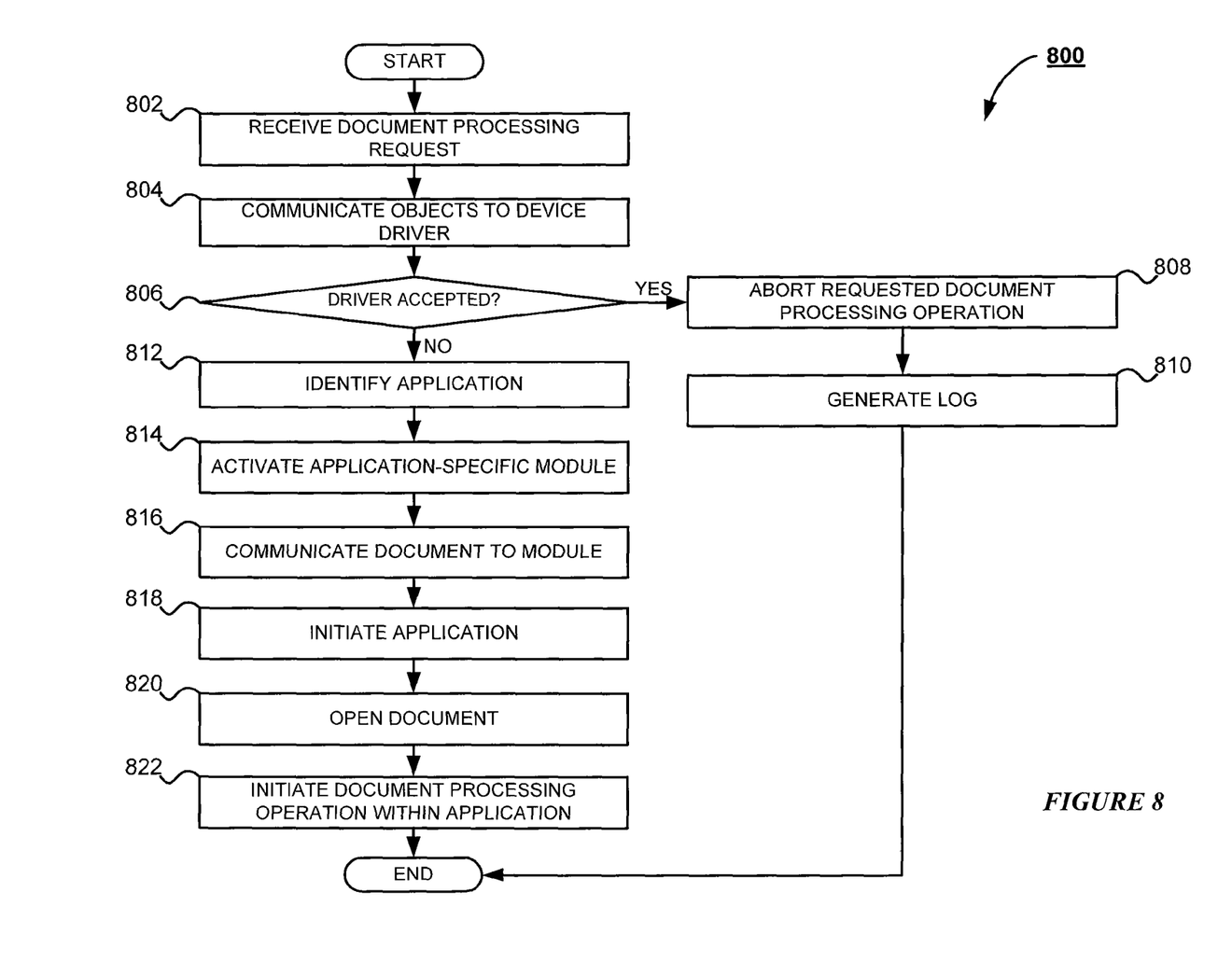
FIG. 8 is a flowchart illustrating a method for simultaneously commencing output of disparately encoded electronic documents according to another embodiment of the subject application.

Referring now to FIG. 8, there is shown a flowchart 800 illustrating a method for method for simultaneously commencing output of disparately encoded electronic documents from the command dispatcher point-of-view in accordance with another embodiment of the subject application. The method depicted in FIG. 8 begins at step 802, whereupon a command dispatcher receives a document processing request from a command parser inclusive of an electronic document file and data objects representing command line arguments. The dispatcher then communicates, at step 804, the data objects to an associated device driver for analysis. That is, the dispatcher communicates the received command line arguments, in the predefined data type format, to a device driver associated with the device that will process the document processing request, e.g., the document processing device 108.

A determination is then made at step 806 whether the device driver has accepted the data objects. Stated another way, a determination is made at step 806 whether the device driver is capable of implementing the output preferences specified by the data objects. When the driver does not accept the data objects, flow proceeds to step 808, whereupon the document processing request is terminated. A log is then generated at step 810 corresponding to the terminated document processing request and preferably stored on the data storage device 114 for later viewing by the associated user, administrator, or the like.

When the determination made at step 806 indicates that the output preferences, as set forth by the data objects, are acceptable to the device driver, flow proceeds to step 812. At step 812, the command dispatcher identifies the specific application with which the electronic document file is associated. That is, the dispatcher determines which of the applications resident on the workstation 104 is capable of opening, editing, outputting, or otherwise modifying the electronic document. It will be appreciated by those skilled in the art that when the received electronic document file is not associated with any specific application, i.e., there is no application on the workstation 104 capable of opening the file, the request is terminated and the termination logged in the associated data storage device 114.

Once the specific application associated with the received electronic document file has been identified, flow proceeds to step 814, whereupon an application-specific module is activated by the dispatcher. Preferably, the data storage device 114 of the workstation 104 includes a plurality of application-specific modules, with each module corresponding to an application resident on the workstation 104. The electronic document file is then communicated, at step 816, to the activated module for further processing. The identified application corresponding to the electronic document file is then initiated by the application-specific module at step 818. The module then opens the document at step 820 within the application and initiates the requested document processing operation via the application at step 822.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for simultaneously commencing output of disparately encoded electronic documents comprising:
    a document processing device including a processor and associated data storage;
    means adapted for receiving, into the document processing device, selection data representative of a plurality of different user-selected electronic documents, each of the plurality of documents being encoded in a unique one of a plurality of disparate formats;

association means adapted for associating each of the plurality of disparate formats with at least one software module;

means adapted for retrieving the plurality of user-selected electronic documents in accordance with received selection data;

means adapted for communicating each of the plurality of user-selected electronic documents to one of a plurality of corresponding software modules in accordance with an output of the association means;

means adapted for acquiring common document output characteristics associated with each of the plurality of user-selected electronic documents;

means adapted for communicating configuration data corresponding to acquired document output characteristics to each of a plurality of unique software modules in a format compatible thereto; and document processor means adapted for commencing a selected document processing operation on each of a series of the user-selected electronic documents by calling a sequence of the software modules, with each module corresponding to one of the series of user-selected electronic documents such that each module is operative in accordance with the common document output characteristics.

2. The system for simultaneously commencing output of disparately encoded electronic documents of claim 1 further comprising means adapted for prompting an associated user for input of common document output characteristics in accordance with common features associated with each software module.

3. The system for simultaneously commencing output of disparately encoded electronic documents of claim 1 further comprising means adapted for outputting data representative of an event wherein at least one of the plurality of user-selected electronic documents has no software module associated therewith.

4. The system for simultaneously commencing output of disparately encoded electronic documents of claim 1 wherein the document processor means includes means adapted for commencing each document processing operation in a selected order.

5. The system for simultaneously commencing output of disparately encoded electronic documents of claim 1 further comprising means adapted for communicating an output of each software module to a common document output device.

6. A method for simultaneously commencing output of disparately encoded electronic documents comprising the steps of:

receiving selection data representative of a plurality of different user-selected electronic documents, each of the plurality of documents being encoded in a unique one of a plurality of disparate formats;

associating each of the plurality of disparate formats with at least one software module;

retrieving the plurality of user-selected electronic documents in accordance with received selection data;

communicating each of the plurality of user-selected electronic documents to one of a plurality of corresponding software modules in accordance with an output of associating each of the plurality of formats with at least one software module;

acquiring common document output characteristics associated with each of the plurality of selected electronic documents; and communicating configuration data corresponding to acquired document output characteristics to each of the software modules in a format compatible thereto; and commencing a selected document processing operation on each of a series of the user-selected electronic documents by calling the software modules, with each module corresponding to one of the series of user-selected electronic documents in accordance with the common document output characteristics.

7. The method for simultaneously commencing output of disparately encoded electronic documents of claim 6 further comprising the step of prompting an associated user for input of common document output characteristics in accordance with common features associated with each software module.

8. The method for simultaneously commencing output of disparately encoded electronic documents of claim 6 further comprising the step of outputting data representative of an event wherein at least one of the plurality of user-selected electronic documents has no software module associated therewith.

9. The method for simultaneously commencing output of disparately encoded electronic documents of claim 6 wherein the step of commencing a selected document processing operation on each of the documents includes commencing each document processing operation in a selected order.

10. The method for simultaneously commencing output of disparately encoded electronic documents of claim 6 further comprising the step of communicating an output of each software module to a common document output device.

11. A system for simultaneously commencing output of disparately encoded electronic documents comprising:

a document processing device including a processor and associated data storage;

an input operable for receiving, into, selection data representative of a plurality of different user-selected electronic documents, each of the plurality of documents being encoded in a unique one of a plurality of disparate formats;

the processor operable for associating each of the plurality of disparate formats with at least one software module;

the processor further operable for retrieving the plurality of user-selected electronic documents in accordance with received selection data;

an output operable for communicating each of the plurality of user-selected electronic documents to one of a plurality of corresponding software modules in accordance with an output of the association;

the processor further operable for acquiring common document output characteristics associated with each of the plurality of user-selected electronic documents;

an output operable for communicating configuration data corresponding to acquired document output characteristics to each of a plurality of unique software modules in a format compatible thereto; and the processor further operable for commencing a selected document processing operation on each of a series of the user-selected electronic documents by calling a sequence of the software modules, with each module corresponding to one of the series of user-selected electronic documents such that each module is operative in accordance with the common document output characteristics.

12. The system for simultaneously commencing output of disparately encoded electronic documents of claim 11 wherein the processor is further operable for prompting an associated user for input of common document output characteristics in accordance with common features associated with each software module.

13. The system for simultaneously commencing output of disparately encoded electronic documents of claim 11 further comprising an output operable for outputting data representative of an event wherein at least one of the plurality of user-selected electronic documents has no software module associated therewith.

14. The system for simultaneously commencing output of disparately encoded electronic documents of claim 11 wherein the processor is further operable for commencing each document processing operation in a selected order.

15. The system for simultaneously commencing output of disparately encoded electronic documents of claim 11 further comprising an output operable for communicating an output of each software module to a common document output device.

\* \* \* \* \*